May 31, 1960
J. HOVORKA
2,938,395
BELT TENSION PULLEY
Filed Sept. 5, 1957
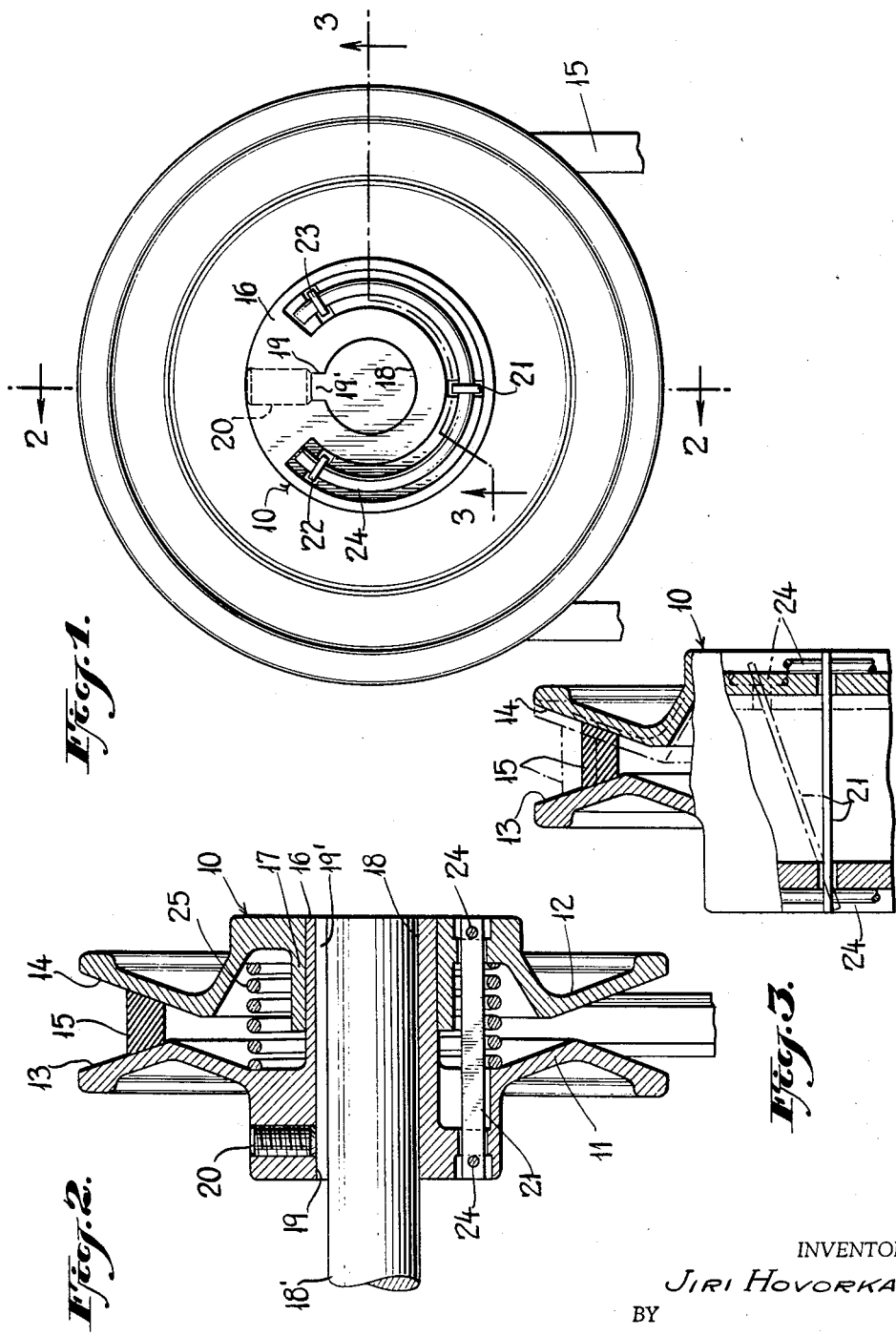
INVENTOR.
JIRI HOVORKA.
BY
*Ward, Mat, Haselton Orme & McClannon*
ATTORNEYS.

United States Patent Office 2,938,395
Patented May 31, 1960

2,938,395

BELT TENSION PULLEY

Jiri Hovorka, Maplewood, N.J., assignor to Royalty Holding Corporation, Maplewood, N.J., a corporation of New Jersey Filed Sept. 5, 1957, Ser. No. 682,172

1 Claim. (Cl. 74—230.17)

This invention relates to improvements in belt tension pulleys and more particularly to a pulley of this type which automatically adjusts itself to take up any slack in the belt and thus maintain substantially uniform tension thereon and eliminate slippage.

Numerous embodiments of tension pulleys are known in the prior art but are generally characterized by certain inherent disadvantages in that their complex construction renders them difficult to manufacture, easily susceptible of breakdowns and economically unfeasible for the general run of motor shaft installations.

The present invention overcomes these and other disadvantages of the prior art pulleys by providing an automatically adjustable tension pulley which is characterized by a minimum number of easily machinable parts and yet is most sturdy and rugged under commercial operating conditions. The invention comprises a pulley formed of two half sections having complementary inner faces contoured to receive a V-belt, with one section having an elongated central sleeve portion adapted to be mounted on a drive or driven shaft, and extending axially toward the other section, with said other section having a central hub portion mounted on the elongated sleeve of the first section in such manner as to permit relative rotation between the sections and a plurality of flexible but nonextensible retaining means, disposed circumferentially about the pulley's axis of rotation and normally extending axially between pulley sections with their ends secured thereto. In accordance with said invention, when the shaft either drives the pulley or is driven thereby, the pulley sections will tend to rotate relative to one another when any slack exists or develops in the belt and as will be described in more detail hereinafter, when such rotation occurs the retaining means will serve to draw the sections axially together, thereby eliminating the slack, maintaining the belt under the desired uniform tension and eliminating slippage thereof.

The invention hereof is of particular utility as applied to fan belts for automobile engines and the like but is in no way limited to such applications, having widespread utility. Other and more specific objects, features and advantages of the invention will appear from the detailed description given below, taken in conjunction with the accompanying drawings which form a part of this specification and illustrate by way of example the presently preferred embodiment of the invention.

In the drawings:

Fig. 1 is a face view of a belt tension pulley according to the invention;

Fig. 2 is a side elevational sectional view taken on the line 2—2 of Fig. 1, showing a belt tension pulley constructed in accordance with the present invention;

Fig. 3 is a sectional view taken on the line 3—3 of Fig. 2 showing in dotted lines the relative positioning of the elements when relative rotation between pulley sections has occurred.

Referring now in more detail to the drawings, the invention comprises a belt tension pulley 10 having two half sections 11, 12 provided with complementary outwardly diverging inner faces 13, 14 which are adapted to receive therebetween and engage in gripping relationship a belt 15 of conventional V-shaped cross-section. Pulley section 11 is provided with an elongated central sleeve 16 which extends axially toward the second pulley section 12. The second pulley section 14 is provided with a central hub portion 17 which is adapted to be mounted as shown on the sleeve 16 of section 11, the contiguous faces of the members 16 and 17 being machined so as to provide a slide fit therebetween, thereby permitting rotation of one section relative to the other in a manner to be described hereinafter. Sleeve 16 is provided with a central bore 18 which is adapted to receive a conventional drive or driven shaft 18' of a motor or the like. The interior of this sleeve 16 may be formed with an axial keyway 19 designed to cooperate with a complementary key 19' provided on the shaft to prevent relative rotation between hub and shaft, and set screws such as 20 may be inserted in suitable bores formed in the sleeve so as to extend radially into contact with the shaft, thereby restraining the pulley section from axial movement along the shaft. Extending axially between pulley sections 11 and 12 are a plurality of retaining members such as 21, 22 and 23 designed to limit the axial spacing between said sections. These retaining members as shown happen to be flat spring-like members but could take any one of several forms, for example, conventional piano wire would suffice, the only need being that the retaining members be flexible enough to permit limited relative rotation between the pulley sections and be not in themselves capable of axial elongation. As shown, the respective ends of the retaining members are secured to each of the pulley sections, as for example by means of locking wires such as 24 shown in Fig. 2 which pass through suitable holes formed in the ends of the retaining members. While three such retaining members are illustrated in the drawings, it will of course be obvious that the number of said members may vary so long as the same are positioned symmetrically about the shaft axis. Resilient means, such as for example a helical compression spring 25, of the desired stiffness may be inserted between the opposed central portions of the pulley sections in order to yieldingly maintain said sections spread apart.

In operation, with the pulley sections in the relative positions shown in Fig. 2 securely gripping the V-belt, the latter is maintained under the proper tension, and assuming that the shaft is driving the pulley, if any slack should develop in the belt, pulley section 11, by virtue of its positive connection to the shaft, will begin to rotate somewhat faster than section 12, thereby resulting in relative rotation between the sections. Such relative rotation will cause the retaining members 21—23 to deflect or twist from their normal axially extending positions to the angular positions shown in dotted line in Fig. 3, thereby foreshortening their axial length, which in turn will draw the pulley sections closer together against the action of spring 25, thereby causing their complementary faces 13 and 14 to engage once again in gripping relationship the sides of the V-belt (as also shown in dotted line in Fig. 3) until the slack is eliminated and the desired tension applied. The aforesaid automatic tensioning adjustment obviously will occur regardless of the direction of rotation of the shaft. In like fashion if the shaft be a driven one, with rotation imparted thereto by the belt and pulley, upon any slack developing in the belt, pulley section 12 being under a lighter load than section 11 will rotate faster, thereby resulting in relative rotation between the sections, together with deflection of the retaining members, and axial movement of the sections toward one another thus eliminating the slack and insuring proper tensioning of the V-belt. It should be understood that resilient means reacts against the axial movement of the pulley sections toward one another and by selecting a resilient means of the proper stiffness characteristic for the anticipated load on the device, the desired tension on the belt will be achieved, thus for example when it is desired to transmit ¼ H.P. at 1750 r.p.m. approximately a 15 lb. spring is required, whereas approximately a 30 lb. spring is required for ½ H.P. at 1750 r.p.m.

Although a particular embodiment of the invention is herein disclosed for purposes of explanation, various further modifications thereof after study of this specification, will be apparent to those skilled in the art to which the invention pertains. Reference should accordingly be had to the appended claims in determining the scope of the invention.

What is claimed and desired to be secured by Letters Patent is:

An automatically adjustable pulley to prevent slippage between the pulley and belt, said pulley comprising a first pulley section including a hub portion and a sleeve carrying the hub portion, said first pulley section having a circumferentially extending inner face which is inclined outwardly axially of the first pulley section, means to mount the sleeve upon a shaft for rotation therewith, a second pulley section including a hub portion and a sleeve carrying the last-named hub portion, the second pulley section having a circumferentially extending inner face which is radially inclined axially of the second pulley section, the last-named sleeve being slidably mounted upon the first-named sleeve for movement axially and circumferentially of the first-named sleeve, the second pulley section having a normal spaced outermost position with relation to the first pulley section, non-extensible links connected with said hub portions and extending axially of said pulley sections and being arranged substantially parallel with the axes of said pulley sections when the second pulley section is in the normal outermost position with relation to the first pulley section and then serving to limit the outermost axial movement of the second pulley section with respect to the first pulley section, said links being inclined with respect to the pulley sections when the second pulley section is turned with relation to the first pulley section so that said links serve to positively move the second pulley section toward the first pulley section, an elongated compressible coil spring surrounding said sleeves and having its ends engaging said hub portions and serving to move the second pulley section outwardly to the normal outermost position with respect to the first pulley section as defined by said links, and a belt having inclined faces contacting with the inclined faces of said pulley sections to frictionally engage therewith, the arrangement being such that when slippage occurs between the belt and the first pulley section such belt will then turn the second pulley section with relation to the first pulley section and the links will be shifted to inclined positions and will positively draw the second pulley section toward the first pulley section, thereby increasing frictional engagement between the inclined faces of said pulley sections and belt and automatically overcoming slippage.

References Cited in the file of this patent
UNITED STATES PATENTS

| 425,390 | Rice | Apr. 8, 1890 |
| 2,678,566 | Oehrli | May 18, 1954 |